(12) United States Patent
Sim et al.

(10) Patent No.: US 9,552,294 B2
(45) Date of Patent: Jan. 24, 2017

(54) DYNAMICALLY CONFIGURING REGIONS OF A MAIN MEMORY IN A WRITE-BACK MODE OR A WRITE-THROUGH MODE

(71) Applicant: Advanced Micro Devices, Inc., Sunnyvale, CA (US)

(72) Inventors: Jaewoong Sim, Atlanta, GA (US); Mithuna S. Thottethodi, Bellevue, WA (US); Gabriel H. Loh, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 726 days.

(21) Appl. No.: 13/736,063

(22) Filed: Jan. 7, 2013

(65) Prior Publication Data
US 2014/0143505 A1    May 22, 2014

Related U.S. Application Data

(60) Provisional application No. 61/728,110, filed on Nov. 19, 2012.

(51) Int. Cl.
*G06F 12/00* (2006.01)
*G06F 12/08* (2016.01)

(52) U.S. Cl.
CPC ....... *G06F 12/0802* (2013.01); *G06F 12/0804* (2013.01); *G06F 12/0862* (2013.01); *G06F 12/0888* (2013.01)

(58) Field of Classification Search
CPC .............. G06F 12/0802; G06F 12/0804; G06F 12/0862; G06F 12/0888

USPC ......................................... 711/142, 143, 154
See application file for complete search history.

(56) References Cited

U.S. PATENT DOCUMENTS

| | | | | |
|---|---|---|---|---|
| 5,524,234 A | * | 6/1996 | Martinez, Jr. ....... | G06F 12/0804 711/141 |
| 5,561,783 A | * | 10/1996 | Vanka ................. | G06F 12/0804 710/57 |
| 9,058,282 B2 | * | 6/2015 | Biswas ............... | G06F 12/0884 |
| 2005/0278486 A1 | * | 12/2005 | Trika .................. | G06F 12/0866 711/142 |
| 2011/0246723 A1 | * | 10/2011 | Van Der Wolf .... | G06F 12/0804 711/143 |
| 2012/0198164 A1 | * | 8/2012 | Damodaran ....... | H03K 19/0016 711/122 |

* cited by examiner

*Primary Examiner* — Matthew Bradley
(74) *Attorney, Agent, or Firm* — Park, Vaughan, Fleming & Dowler LLP

(57) ABSTRACT

The described embodiments include a main memory and a cache memory (or "cache") with a cache controller that includes a mode-setting mechanism. In some embodiments, the mode-setting mechanism is configured to dynamically determine an access pattern for the main memory. Based on the determined access pattern, the mode-setting mechanism configures at least one region of the main memory in a write-back mode and configures other regions of the main memory in a write-through mode. In these embodiments, when performing a write operation in the cache memory, the cache controller determines whether a region in the main memory where the cache block is from is configured in the write-back mode or the write-through mode and then performs a corresponding write operation in the cache memory.

18 Claims, 5 Drawing Sheets

DYNAMICALLY CONFIGURING REGIONS OF A MAIN MEMORY IN A WRITE-BACK MODE OR A WRITE-THROUGH MODE

RELATED APPLICATION

The instant application is a non-provisional application from, and hereby claims priority under 35 U.S.C. §119 to, pending U.S. provisional patent application No. 61/728,110, which is titled "A Mostly-Clean DRAM Cache for Effective Hit Speculation and Self-Balancing Dispatch," by inventors Jaewoong Sim, Gabriel H. Loh, Hyesoon Kim, James M. O'Connor, and Mithuna Thottehodi, which was filed on 19 Nov. 2012, and which is herein incorporated by reference.

BACKGROUND

Field

The described embodiments relate to memories in electronic devices. More specifically, the described embodiments relate to dynamically configuring regions of a main memory in a write-back mode or a write-through mode.

Related Art

Many modern computing devices (e.g., laptop/desktop computers, smart phones, set-top boxes, appliances, etc.) include a processing subsystem with one or more caches. Caches are generally smaller, fast-access memory circuits located in or near the processing subsystem that can be used to store cache blocks that are retrieved from lower levels of a memory hierarchy in the computing device (i.e., other, larger caches and/or memories) to enable faster access to the stored cache blocks.

In some of these computing devices, caches are operated in a write-through mode. In the write-through mode, when a cache block with modified data is written in a cache (i.e., stored to the cache), the cache block is also immediately forwarded to a next lower level of the memory hierarchy to be written in the next lower level of the memory hierarchy. By forwarding the cache block in this way in the write-through mode, the cache is kept consistent with the next lower level of the memory hierarchy. However, operating in the write-through mode incurs costs in terms of bandwidth consumption, processing time, delay, etc. related to forwarding each cache block from the cache to the next lower level of the memory hierarchy.

In some of these computing devices, caches are operated in a write-back mode. In the write-back mode, cache blocks with modified data can be written to a cache without being immediately forwarded to the next lower level in the memory hierarchy. Thus, the cache can include cache blocks with data that is different than the data in the same cache block in the next lower level of the memory hierarchy. In these computing devices, when a cache block with modified data is to be used somewhere else in the computing device, the cache block is copied from the cache to the location where the cache block is to be used. By writing modified cache blocks in this way in the write-back mode, entities associated with the cache (e.g., processing subsystems, etc.) can make multiple writes/modifications to cache blocks without requiring that the cache blocks be immediately forwarded to the next lower level in the memory hierarchy each time a modification is made to the cache blocks. This can conserve bandwidth, processing time, etc. in the computing device. However, storing modified cache blocks in caches in this way introduces delay when the cache block is to be used somewhere else in the computing device and complicates operations that rely on the caches in the memory hierarchy holding consistent data.

As described above, straightforward implementations of the write-through mode and the write-back mode, while having some benefits, are also associated with significant detriments. To avoid some of the detriments associated with operating a cache in one mode or the other, designers have proposed determining whether to operate an entire cache in the write-through mode or the write-back mode based on a number of cache blocks with modified data in the cache. In this system, if the number of cache blocks with modified data in the cache is greater than a threshold number, the entire cache is switched to operating in the write-through mode. Otherwise, the entire cache is operated in a write-back mode. Despite providing some improvement over the straightforward implementation of write-back mode or write-through mode, this technique still incurs costs in terms of delay, bandwidth consumption, processing time, etc.

Designers have also proposed dividing a main memory in a device into a set of regions and statically configuring the regions in the main memory to operate either in the write-back mode or write-through mode (i.e., statically configuring caches in the device to handle writes of cache lines from the regions as either write-back or write-through). Despite providing some improvement over the straightforward implementation of write-back mode or write-through mode for the entire cache, this technique does not provide optimal performance as access patterns in the main memory vary at runtime.

SUMMARY

The described embodiments include a main memory and a cache memory (or "cache") with a cache controller that includes a mode-setting mechanism. In some embodiments, the mode-setting mechanism configures at least one region of the main memory in a write-back mode based on a dynamically determined access pattern, and configures other regions of the main memory in a write-through mode. The cache controller then performs writes in the cache based on the configuration of corresponding regions in the main memory.

In some embodiments, the mode-setting mechanism is configured to dynamically determine the access pattern for the main memory by keeping a count of a number of write operations that occur in each region in a set of regions in the main memory (e.g., by comparing information from the write operations to information about a set of regions in the main memory to determine the region in the main memory to which each of the write operations is directed) and determining when the count for a region indicates that more than a threshold number of write operations have occurred in the region. In these embodiments, when configuring at least one region of the main memory in the write-back mode based on the access pattern, the mode-setting mechanism configures a region in the write-back mode when the count indicates that more than the threshold number of write operations have occurred in the region.

In some embodiments, when keeping the count of the number of write operations that occur in each region in the set of regions in the main memory, the mode-setting mechanism is configured to, for each write operation that occurs in the main memory, determine a region in the main memory to which the write operation is directed. Based on the determined region, the mode-setting mechanism is configured to compute indices for a Bloom filter and increment counts in corresponding positions of the Bloom filter for each of the computed indices.

In some embodiments, when determining when the count for a region indicates that more than a threshold number of write operations have occurred in the region the mode-setting mechanism is configured to, after incrementing the counts in the corresponding positions of the Bloom filter for a region, determine when the counts in each of the corresponding positions of the Bloom filter are greater than the threshold number. The mode-setting mechanism then determines that the count indicates that more than the threshold number of write operations have occurred in the region when the counts in each of the corresponding positions of the Bloom filter are greater than the threshold number.

In some embodiments, after configuring the region in the write-back mode when the count indicates that more than the threshold number of write operations have occurred in the region, the mode-setting mechanism is configured to perform a predetermined operation to reduce the count in corresponding positions of the bloom filter (e.g., subtract a given amount from the counts, divide the counts in half, etc.).

In some embodiments, at a predetermined time after configuring the regions of the main memory in the write-back mode or the write-through mode, the mode-setting mechanism is configured to re-configure at least one region of the main memory from a write-back mode to a write-through mode or from a write-through mode to a write-back mode based on the count of the number of write operations that occur in each region.

In some embodiments, when configuring the at least one region of the main memory in the write-back mode, the mode-setting mechanism is configured to write information about the at least one region to an entry in a dirty list, wherein regions without information in an entry in the dirty list are configured in the write-through mode.

In some embodiments, before writing the information about the region to the entry in the dirty list, the mode-setting mechanism is configured to determine that existing information about another region is to be deleted from the entry to make the entry available for writing the information about the region to the entry. In these embodiments, the mode-setting mechanism is configured to delete the existing information about the other region from the determined entry from the dirty list.

In some embodiments, the dirty list is set associative. In these embodiments, when determining that existing information about another region is to be deleted from the entry, the mode-setting mechanism is configured to compute an index for a set in which the information about the region is to be written. The mode-setting mechanism is configured to then determine an existing entry in the set from which existing information about the other region is to be deleted to make space available for adding the information about the region.

In some embodiments, the cache controller is configured to check the dirty list before writing a cache block to the cache to determine whether a region that the cache block is from in the main memory is configured in the write-back mode or the write-through mode. Based on the check, the cache controller is configured to perform a corresponding write operation for the cache block in the cache (e.g., is configured to perform a write-back write operation when the cache block is from a region in the main memory that is configured in the write-back mode).

In some embodiments, configuring the at least one region of the main memory in the write-back mode comprises configuring at most a predetermined number of regions in the main memory in the write-back mode.

In some embodiments, when writing a cache block from a region of the main memory that is configured in write-through mode into the cache, the cache controller is configured to immediately forward the cache block to a lower level of a memory hierarchy to be written in the lower level of a memory hierarchy. In some embodiments, when writing a cache block from a region of the main memory that is configured in write-back mode into the cache, the cache controller is configured to not forward the cache block to a lower level of a memory hierarchy to be written in the lower level of the memory hierarchy until after predetermined event occurs.

In some embodiments, the cache controller is configured to statically configure one or more regions in an excluded set of regions in the main memory in the write-through mode or write-back mode, wherein the regions in the excluded set of regions are not configured based on the determined access pattern.

BRIEF DESCRIPTION OF THE FIGURES

Throughout the figures and the description, like reference numerals refer to the same figure elements.

DETAILED DESCRIPTION

Figure 1:
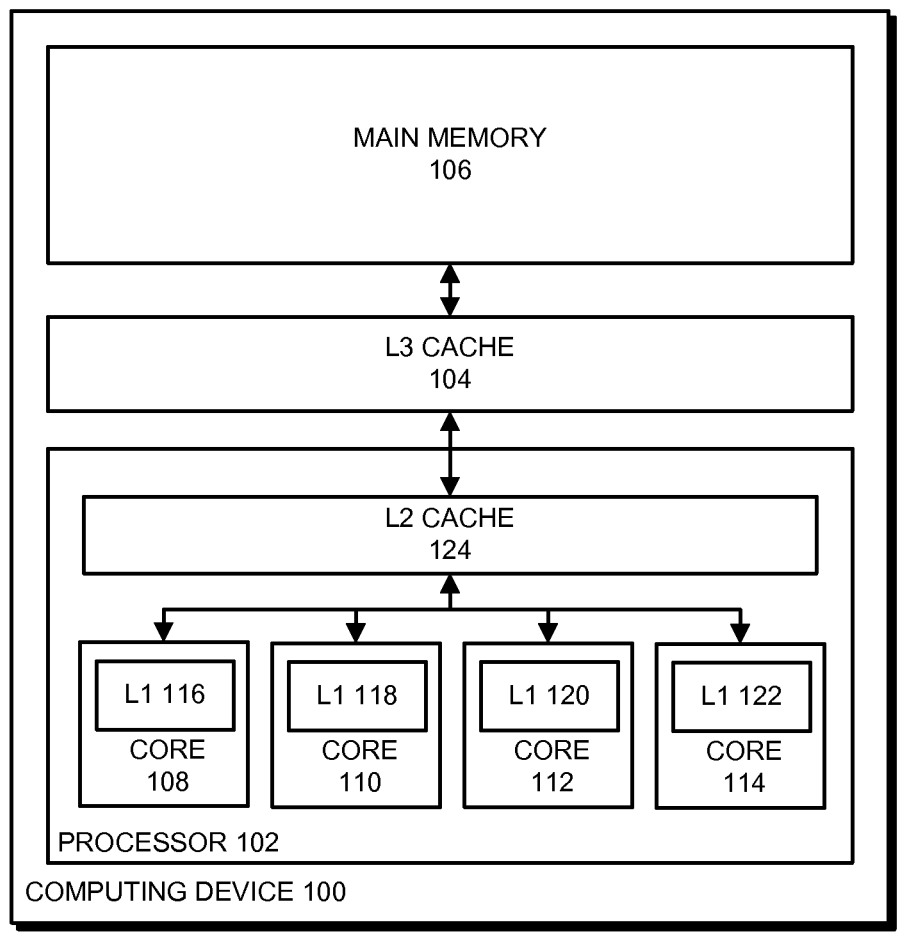
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

In some embodiments, a computing device (e.g., computing device 100 in FIG. 1) uses code and/or data stored on a computer-readable storage medium to perform some or all of the operations herein described. More specifically, the computing device reads the code and/or data from the computer-readable storage medium and executes the code and/or uses the data when performing the described operations.

A computer-readable storage medium may be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/processor cores/central processing units (CPUs), application-specific integrated circuit (ASIC) chips, field-programmable gate arrays (FPGAs), caches/cache controllers, embedded processors, graphics processors (GPUs)/graphics processor cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., some or all of computing device 100 (see FIG. 1), cache controller 204 (see FIG. 2), cache 200, etc. and/or some portion thereof) is stored on a computer-readable storage medium that includes a database or other data structure which can be read by a computing device and used, directly or indirectly, to fabricate the hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In the following description, functional blocks may be referred to in describing some embodiments. Generally, functional blocks include one or more circuits (and, typically, multiple interrelated circuits) that performs the described operations. In some embodiments, the circuits in a functional block include circuits that execute program code (e.g., machine code, firmware, etc.) to perform the described operations.

Overview

The described embodiments include a computing device with a main memory and a cache memory (or "cache") that includes a cache controller that with a mode-setting mechanism. The mode-setting mechanism configures at least one region of the main memory in a write-back mode based on a dynamically-determined access pattern in the main memory and configures remaining regions in the main memory in a write-through mode. For example, in some embodiments, to determine the access pattern, the mode-setting mechanism keeps a count of writes (stores) made to one or more regions in the main memory while the main memory is operating at runtime. The mode-setting mechanism then configures the at least one region of the main memory in the write-back mode when more than a threshold number of writes has occurred in at least one of the one or more regions and configures the remaining regions of the main memory in the write-through mode. The cache controller then performs writes in the cache based on the configuration of corresponding regions in the main memory.

In some embodiments, the mode-setting mechanism uses a counting Bloom filter to keep the count of the writes in the one or more regions in the main memory. Generally, a counting Bloom filter is a data structure that may be used to keep records of events (e.g., the above-described writes in regions of the main memory) in a compact form. These embodiments thereby avoid using separate per-region counters and/or other data structures larger than the counting Bloom filter.

In some embodiments, when configuring a given region of the main memory in the write-back mode, the mode-setting mechanism adds an entry for the region to a dirty list. Then, when the cache controller is subsequently preparing to write a cache block in the cache, the cache controller checks the dirty list to determine if a corresponding region in the main memory (e.g., a region in the memory where a copy of the cache block is stored) is in the dirty list. If so, the cache controller writes the cache block to the cache without immediately forwarding the cache block to the next lower level in the memory hierarchy to be written therein (i.e., handles the write in the cache in the write-back mode). Otherwise, if the corresponding region in the main memory is not in the dirty list, the cache controller writes the cache block to the cache and immediately forwards the cache block to the next lower level of the memory hierarchy to be written therein (i.e., handles the write in the cache in the write-through mode).

By configuring the at least one region of the main memory in write-back mode based on the number of writes that are occurring in the one or more regions of the main memory, the cache controller configures the writes in the cache so that writes for corresponding regions in the main memory that are experiencing a larger number (or more than a threshold number) of writes are handled in a mode (write-back mode) that is better suited for the larger numbers of writes, and so that the remaining regions are handled in a mode that is better suited for the smaller numbers of writes (write-through mode). In this way, the described embodiments can improve the performance of the cache and can conserve system bandwidth and processing power, which can lead to better overall performance of the computing device.

Computing Device

FIG. 1 presents a block diagram illustrating a computing device 100 in accordance with some embodiments. As can be seen in FIG. 1, computing device 100 includes processor 102, L3 cache 104, and main memory 106. Processor 102 is generally a device that performs computational operations in computing device 100. Processor 102 includes four processor cores 108-114, each of which includes a computational mechanism such as a central processing unit (CPU), a graphics processing unit (GPU), and/or an embedded processor.

Processor 102 also includes cache memories (or "caches") used for storing instructions and data that are used by processor cores 108-114 for performing computational operations. As can be seen in FIG. 1, the caches in processor 102 include a level-one (L1) cache 116-122 (e.g., "L1 116") in each processor core 108-114 that is used for storing instructions and data for use by the processor core. Generally, L1 caches 116-122 are the smallest of a set of caches in computing device 100 (e.g., 96 kilobytes (KB) in size) and are located closest to the circuits (e.g., execution units, instruction fetch units, etc.) in the processor cores 108-114 that use the instructions and data that are stored in the L1 caches 116-122. The closeness of the L1 caches 116-122 to the corresponding circuits enables the fastest access to the instructions and data stored in the L1 caches 116-122 from among the caches in computing device 100.

Processor 102 also includes a level-two (L2) cache 124 that is shared by processor cores 108-114 and hence is used for storing instructions and data for all of the sharing processor cores 108-114. Generally, L2 cache 124 is larger than the L1 caches 116-122 (e.g., 2048 KB in size) and is located outside, but close to, processor cores 108-114 on the same semiconductor die as the processor cores 108-114. Because L2 cache 124 is located outside the processor cores 108-114 but on the same die, access to the instructions and data stored in L2 cache 124 is slower than accesses to the L1 caches, but faster than accesses to L3 cache 104 in computing device 100.

Returning to computing device 100, the largest of the caches in computing device 100 (at e.g., 16 MB in size), level-three (L3) cache 104 is shared by the processor cores 108-114 and hence is used for storing instructions and data for all of the processor cores. In some embodiments, L3 cache 104 is located external to processor 102 (e.g., on a different die or dies than processor 102). Accordingly, accessing data and instructions in L3 cache 104 is typically slower than accessing data and instructions in the higher-level caches.

In some embodiments, each of L1 caches 116-122, L2 cache 124, and L3 cache 104 (collectively, "the caches") include memory circuits that are used for storing cached data and instructions. For example, the caches may include one or more of static random access memory (SRAM), embedded dynamic random access memory (eDRAM), DRAM, double data rate synchronous DRAM (DDR SDRAM), and/or other types of memory circuits.

Main memory 106 comprises memory circuits that form a "main memory" of computing device 100. Main memory 106 is used for storing instructions and data for use by the processor cores 108-114 on processor 102. In some embodiments, main memory 106 is fabricated from memory circuits such as one or more of DRAM, SRAM, DDR SDRAM, and/or other types of memory circuits.

Taken together, L1 caches 116-122, L2 cache 124, L3 cache 104, and main memory 106 form a "memory hierarchy" in and for computing device 100. Each of the caches and main memory 106 are regarded as levels of the memory hierarchy, with the lower levels including the larger caches and main memory 106. Within computing device 100, memory requests are preferentially handled in the level of the memory hierarchy that results in the fastest and/or most efficient operation of computing device 100.

In some embodiments, main memory 106 is divided into a set of regions that each contain a given number of addresses. In these embodiments, the regions in main memory 106 can be any size, e.g., 4 KB, 256 KB, 1 MB, and/or another size. For example, in some embodiments, the regions in memory are the same size as pages of memory used in an operating system that executes in computing device 100. In these embodiments, the regions are distributed in main memory 106 in a predetermined pattern (evenly, scattered, in blocks of locations, etc.). In some embodiments, the size of the regions is not permanently set, but instead can be (dynamically) set and/or adjusted at runtime, thereby enabling dynamic configuration and re-configuration of region sizes.

In some embodiments, based on a dynamically determined access pattern for one or more of the regions in main memory 106 (e.g., a number of writes to one or more regions), a cache controller in a cache (see FIG. 2) such as L3 cache 104, L2 cache 124, etc. can configure one or more of the regions in a write-back mode, and can configure the remaining regions in a write-through mode. In these embodiments, when a cache block is to be written in the cache, the cache controller determines how the write is to be handled in the cache based on the write-back/write-through configuration of the corresponding region in main memory (e.g., of a region in main memory where the cache block is from/in which a copy of the cache block is stored). More specifically, if the cache block is from a region in main memory 106 that is configured in the write-through mode, in addition to writing the cache block in the cache, the cache controller immediately forwards the cache block to a next lower level of the memory hierarchy to be written therein. However, if the cache block is from a region in main memory 106 that is configured in the write-back mode, the cache controller writes the cache block in the cache without immediately forwarding the cache block to a next lower level of the memory hierarchy to be written therein (and the cache block may not be forwarded to the next lower level of the memory hierarchy until an event such as invalidation or eviction occurs in the cache). In this way, the cache controller can handle writes to the cache in accordance with the write-back/write-through configuration of the corresponding region of main memory 106.

Although embodiments are described with a particular arrangement of processor cores, some embodiments include a different number and/or arrangement of processor cores. For example, some embodiments have only one processor core (in which case the caches are used by the single processor core), while other embodiments have two, five, eight, or another number of processor cores—with the memory hierarchy adjusted accordingly. Generally, the described embodiments can use any arrangement of processor cores that can perform the operations herein described.

Additionally, although embodiments are described with a particular arrangement of caches, some embodiments include a different number and/or arrangement of caches. For example, in some embodiments, some or all of the caches (e.g., L1 caches 116-122, etc.) are divided into separate instruction and data caches. Additionally, L2 cache 124 and or L3 cache 104 may not be shared in the same way as shown, and hence may only be used by a single processor core, two processor cores, etc. (and hence there may be multiple L2 caches 124 and/or L3 caches 104 in processor 102). As another example, some embodiments include different levels of caches, from only one level of cache to multiple levels of caches, and these caches can be located in processor 102 and/or external to processor 102. For example, in some embodiments, L3 cache 104 is located on the same die as processor 102. Generally, the described embodiments can use any arrangement of caches that can perform the operations herein described.

Moreover, although computing device 100 and processor 102 are simplified for illustrative purposes, in some embodiments, computing device 100 and/or processor 102 include additional mechanisms for performing the operations herein described and other operations. For example, computing device 100 and/or processor 102 can include power controllers, mass-storage devices such as disk drives or large semiconductor memories (as part of the memory hierarchy), batteries, media processors, input-output mechanisms, communication mechanisms, networking mechanisms, display mechanisms, etc.

Cache

Figure 2:
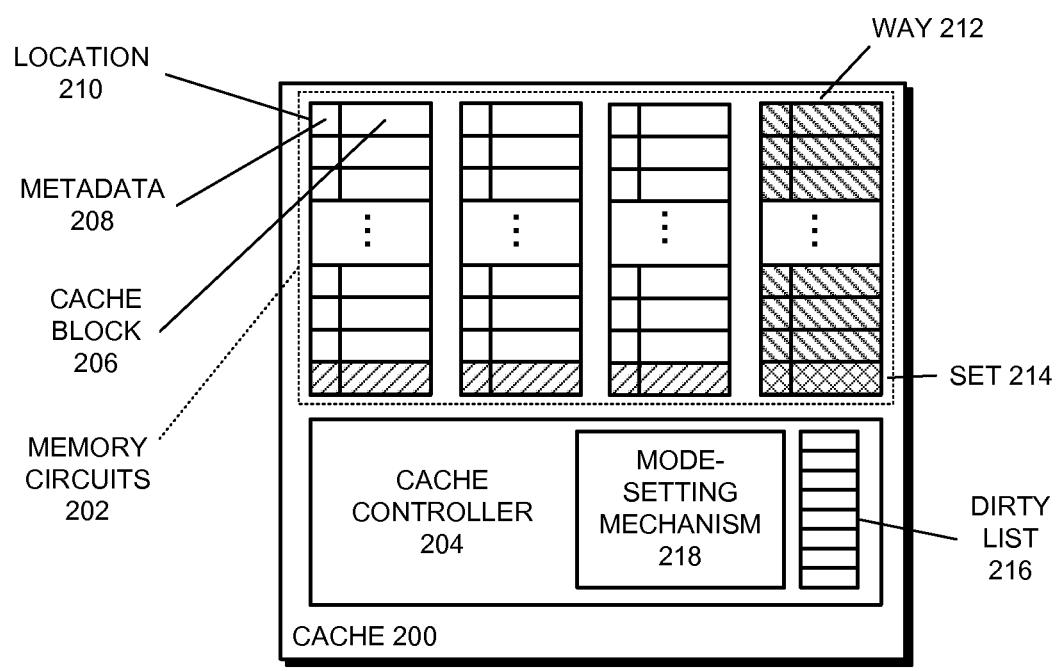
FIG. 2 presents a block diagram illustrating a cache in accordance with some embodiments.

FIG. 2 presents a block diagram illustrating a cache 200 in accordance with some embodiments. Cache 200 is a general example of an internal configuration that may be implemented in any of the caches in the described embodiments. For example, some or all of L1 caches 116-122, L2 cache 124, and L3 cache 104 can have, but are not required to have, internal configurations similar to cache 200. In this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106.

As can be seen in FIG. 2, cache 200 includes memory circuits 202 and cache controller 204. Cache controller 204 is a functional block that performs various functions for controlling operations in cache 200. For example, cache controller 204 can manage writing/storing cache blocks to, invalidating cache blocks in, and evicting cache blocks from cache 200; can perform lookups for cache blocks in cache 200; can handle coherency operations for cache 200; and/or can respond to requests for cache blocks from cache 200.

Memory circuits 202 (interchangeably called "memory" in cache 200) include one or more of SRAM, eDRAM, DRAM, DDR SDRAM, and/or other types of memory circuits that are divided into a set of locations, each location configured to store a cache block and metadata that includes information about the cache block (tags, indicators, flags, etc.). A cache block 206 and corresponding metadata 208 are labeled for example location 210 in cache 200. In some embodiments, each cache block comprises a cache line (although other embodiments can use different-sized cache blocks). Note that, although shown in a same "location" in cache 200, in some embodiments, the metadata and the cache block for each "location" are stored in two physically separate tables/arrays/memory circuits (e.g., a metadata array and a cache block array).

As described above, the memory in the caches in computing device 100 is limited (e.g., to 96 KB for L1 caches 116-122, 2048 KB for L2 cache 124, etc.), and so every cache block that may be loaded from main memory 106 cannot be simultaneously stored in a given cache. Instead, locations in the caches are shared, and therefore made available for storing cache blocks from various addresses in main memory 106. In the described embodiments, any of a number of operations/policies can be used for managing the storage of cache blocks in the limited memory in the caches. For example, some embodiments use "set associativity" for managing the storage of cache blocks. For set associativity, the memory in the cache is divided into a number of sets, and the sets are further divided into a number of ways. As can be seen in FIG. 2, cache 200 includes four ways, with an example way 212 indicated by left-leaning hash marks in the rightmost of the four ways in cache 200. In an example embodiment where the memory in cache 200 is 512 KB in size and 1 KB cache blocks are to be stored in cache 200, each way has storage for 128 cache blocks, and hence each way includes 128 sets (with ellipses representing sets not shown in FIG. 2). Each of the sets has a location in each way, with an example set 214 indicated by right-leaning hash marks in the bottommost location in each of the four ways in cache 200. Each set can be used to store cache blocks from a range of memory addresses, and hence the corresponding location in each way for the set can be used to store cache blocks from the range of memory addresses.

In embodiments that use set associativity, upon receiving a memory request to write (store) a cache block in cache 200 (e.g., from a processor core or a lower level in the memory hierarchy), cache controller 204 determines the set in which the received cache block is to be written. For example, in some embodiments, cache controller 204 compute the set using a hash function for which the input is some or all of an address for the cache block from the memory request. Cache controller 204 then determines if a location in the set can be used for storing the received cache block without replacing a cache block presently stored in that location (i.e., when there is an available/open location in the set). When a location in the set is available, cache controller 204 writes the cache block into the location.

However, when cache controller 204 determines that there is no location in the set that can be used without replacing a cache block presently stored in that location, cache controller 204 determines a cache block that is to be replaced from among the locations in the set. In other words, when each location in a given set is presently use for storing a cache block, in order to store a new cache block in the set, the cache block in one of the locations in the set should be evicted from cache 200 (e.g., written to a lower level of the memory hierarchy and/or overwritten) to make space for the cache block. When determining the cache block that is to be replaced, cache controller 204 can adhere to a replacement policy, which is generally an algorithm or set of rules used to determine the cache block that is to be evicted. In some embodiments, the replacement policy can be a first-in-first out policy, in which the first cache block to be stored in a set is evicted, a least-recently-used policy, in which the least recently accessed location in the set is evicted, and/or another replacement policy. After evicting the cache block from the determined location, cache controller 204 can store the received cache block in the location.

As described above, in some embodiments, based on configurations of corresponding regions of main memory 106, writes to locations in cache 200 can be handled in a write-back mode or a write-through mode. In these embodiments, as a cache block is written into a given location in cache 200, cache controller 204 determines if the region that the cache block is from in main memory 106 is configured in the write-back mode or the write-through mode. When writing a cache block from a region in main memory 106 that is configured in the write-back mode to a location in cache 200, the cache block is stored in the location in cache 200 without being immediately forwarded to the next lower level in the memory hierarchy to be written in the next lower level of the memory hierarchy. Thus, the location in cache 200 can include a cache block with "dirty" data that is different than the data in the same cache block next lower level of the memory hierarchy. In these embodiments, when a modified cache block in cache 200 is to be used somewhere else in the computing device (in another cache, in a processing subsystem, etc.), the modified cache block is copied from the cache to the location where the cache block is to be used. In contrast, when writing a cache block from a region in main memory 106 that is configured in the write-through mode to a location in cache 200, the cache block is stored in the location in cache 200, and is immediately forwarded to a next lower level in a memory hierarchy to be stored in the next lower level.

In some embodiments, cache 200, cache controller 204 and/or some other mechanism in computing device 100 includes records of cache blocks that were written to cache 200 and the mode in which they were written (write-through mode and/or write-back mode) that can be used for performing operations on the cache blocks. For example, the record can include a listing of dirty/modified cache blocks in cache 200 that can be used to identify cache blocks written in the write-back mode. In some embodiments, the metadata for cache blocks includes these records.

Cache controller 204 includes dirty list 216 and mode-setting mechanism 218. Dirty list 216 includes a table (e.g., stored in cache controller 204) that is divided into a number of entries. Each entry includes information about a region of main memory 106 that is configured in the write-back mode, as well as metadata associated with the entry (e.g., valid flags, replacement policy information, etc.). For example, the information about the region in each entry can include a starting address of the region, an ending address of the region, a size of the region, an identifier for the region, and/or other information. When a memory request is received that writes (stores) a cache block in cache 200, cache controller 204 checks dirty list 216 to determine if the cache block is from a region in main memory 106 (e.g., a copy of the cache block is stored in a region in main memory) that is configured in the write-back mode. If it is determined that the cache block is from a region in main memory 106 that is in dirty list 216, and hence from a region in main memory 106 that is configured in the write-back mode, cache controller 204 writes the cache block to cache 200 without immediately forwarding the cache block to the next lower level of the memory hierarchy. Otherwise, if it is determined that the cache block is from a region in main memory 106 that is not in dirty list 216, and hence from a region in main memory 106 that is configured in the write-through mode, cache controller 204 writes the cache block to cache 200 and immediately forwards the cache block to the next lower level of the memory hierarchy to be written therein.

Note that "immediately" forwarding cache blocks as used herein includes performing operations for sending the cache block to the next lower level of the memory hierarchy in a timely way (but does not necessarily imply "instantaneous" forwarding of the cache blocks). For example, the cache block may be placed in a next-level write queue to be handled in order with other cache blocks in the next-level write queue that are to be forwarded to the next lower level of the memory hierarchy. In contrast, when cache blocks are not immediately forwarded (in the write-back mode), the cache blocks are written to cache 200 without being placed in the next-level write queue. These cache blocks can remain in cache 200 without being forwarded to the next lower level of the memory hierarchy until an event occurs (e.g., a request to deliver the modified cache line to another entity in computing device 100, an eviction from cache 200, etc.).

Mode-setting mechanism 218 is a functional block that is configured to set and adjust the operating modes for regions of main memory 106. Specifically, mode-setting mechanism 218 is configured to dynamically determine which, if any, regions of main memory 106 are to be placed in the write-back mode and, hence, which remaining regions are placed in write-through mode. In order to determine the regions to be placed in the write-back mode, mode-setting mechanism 218 maintains a count of the writes to one or more regions of main memory 106 (i.e., cache blocks being stored in the regions) at runtime. Mode-setting mechanism 218 then configures (and re-configures) regions of main memory 106 in the write-back mode when more than a threshold number of writes has occurred in at least one of the one or more regions. When configuring a given region of main memory 106 in the write-back mode, mode-setting mechanism 218 updates dirty list 216 to include an entry for the region.

In some embodiments, dirty list 216 includes a number of entries N, where N=15, 32, or another number. Because, as described above, regions of main memory 106 are configured in the write-back mode by being added to dirty list 216, in these embodiments, only N regions of main memory 106 may simultaneously be configured in write-back mode. However, the number of regions of main memory 106 that may meet a condition to be configured in the write-back mode may exceed N. For this reason, when mode-setting mechanism 218 makes an update to dirty list 216 (particularly, when each of the entries in dirty list 216 is full), an existing entry in dirty list 216 may need to be chosen to be overwritten by the update. In some embodiments, dirty list 216 is managed using a replacement policy such as least recently used (LRU), least used (LU), first-in-first-out, etc., and the entry that is chosen to be overwritten when an update is to be made is chosen in accordance with the replacement policy.

In some embodiments, dirty list 216 is managed using some form of associativity (an example of set associativity is described above with respect to cache 200), such as set associativity. In embodiments that use set associativity, when determining that an existing entry is to be deleted from dirty list 216, mode-setting mechanism 218 is configured to compute an index for a set in dirty list 216 into which the information about the region is to be written. Next, mode-setting mechanism 218 is configured to determine an existing entry in the set from to be deleted to make space available for adding the information about the region.

Although cache 200 is described using certain functional blocks and a particular number of ways, some embodiments include different numbers and/or types of functional blocks and/or ways. For example, cache 200 can include 8, 16, or another number of ways. Generally, the described embodiments can include any functional blocks and/or ways in cache 200 and/or computing device 100 that enable the operations herein described. Moreover, although some embodiments are described using set associativity, other embodiments use different types of associativity and/or different management policies for cache 200. For example, some embodiments use skewed associativity, full associativity, etc.

In addition, although mode-setting mechanism 218 and/or dirty list 216 are shown in cache controller 204, in some embodiments, mode-setting mechanism 218 and/or dirty list 216 are located elsewhere in computing device 100. For example, mode-setting mechanism 218 and/or dirty list 216 can be incorporated into a memory controller (not shown) in computing device 100. Generally, mode-setting mechanism 218 and/or dirty list 216 can be located anywhere in computing device 100 where mode-setting mechanism 218 and/or dirty list 216 can perform the operations herein described.

Counting Bloom Filter

As described above, some embodiments use a counting Bloom filter to keep track of writes that occur in given regions of main memory 106. To assist in describing a counting Bloom filter, a basic Bloom filter (or a "Bloom filter") is first described, and then the counting Bloom filter is described.

Figure 3:
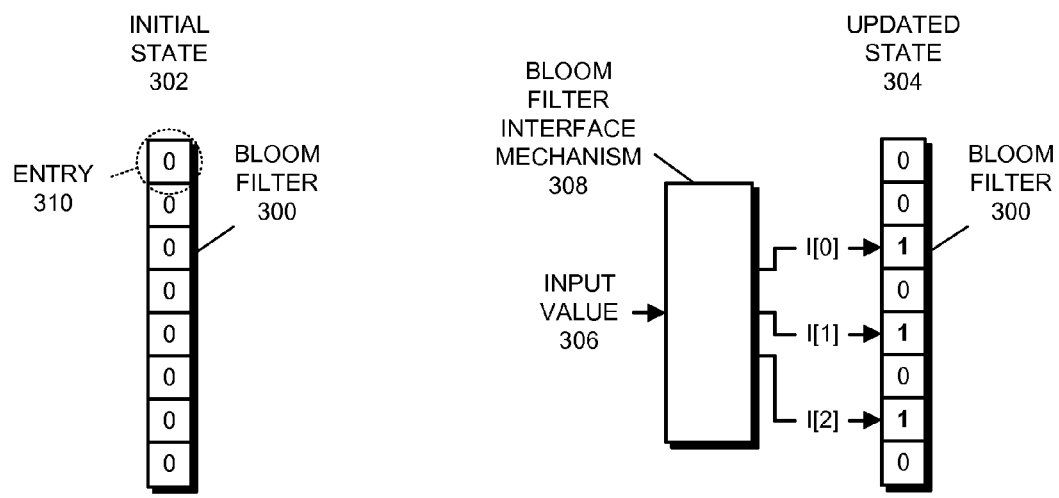
FIG. 3 presents a block diagram illustrating a Bloom filter in accordance with some embodiments.

FIG. 3 presents a block diagram illustrating a Bloom filter 300 in accordance with some embodiments. Generally, Bloom filter 300 includes an array with a number of entries (an example entry 310 is indicated in FIG. 3) that are each configured to hold an indicator such as a zero or a one. Bloom filter 300 also includes (or is associated with) a Bloom filter interface mechanism 308 that is configured to: (1) create a record in Bloom filter 300 of input values that have been received by Bloom filter interface mechanism 308, and (2) perform lookups in Bloom filter to determine if an input value has been received by Bloom filter interface mechanism 308.

Bloom filter interface mechanism 308 includes circuits that perform one or more operations on a received input value (e.g., combinatorial, mathematical, bit-level, etc.) to generate a corresponding set of indices. For example, in some embodiments, Bloom filter interface mechanism 308 includes internal circuits that implement a hash function that generates a set of indices based on a received input value. Bloom filter interface mechanism 308 can use the set of indices to record the receipt of the corresponding input value in Bloom filter 300 or perform a lookup to determine if Bloom filter 300 includes a record indicating that the input value has previously been received.

For the example in FIG. 3, Bloom filter 300 is in an initial state 302 in the left side of the figure, and in an updated state 304 in the right side of the figure. In initial state 302, Bloom filter 300 has just been created or initialized and thus the entries in Bloom filter 300 are set to zero. In this state, Bloom filter 300 holds no record of any input values having been received by Bloom filter interface mechanism 308.

To arrive at updated state 304, an input value 306 is first received by Bloom filter interface mechanism 308. From input value 306, Bloom filter interface mechanism 308 generates a corresponding set of indices (shown as I[0]-I[2] in FIG. 3) and updates Bloom filter 300 elements associated with the indices. As shown in FIG. 3, the update causes the third, fifth, and seventh elements of the Bloom filter to be set to one. After the update, the entries of Bloom filter 300 indicate (i.e., include a record) that input value 306 was received by Bloom filter interface mechanism 308.

Subsequent to the update, Bloom filter interface mechanism 308 may receive a lookup query inquiring if input value 306 has been received by Bloom filter interface mechanism 308. Bloom filter interface mechanism 308 can then process the query by generating a corresponding set of indices from input value 306 (which would again be I[0]-I[2]) and checking the corresponding entries in Bloom filter 300 to determine if the entries were set to one. Here, because the entries are set to one, Bloom filter interface mechanism 308 can send a response to the query indicating that input value 306 may have been received by Bloom filter interface mechanism 308.

One general property of Bloom filters is that false-positive responses to queries are permissible, whereas false-negative responses to queries are impermissible (i.e., if an input value has been encountered by Bloom filter interface mechanism 308, Bloom filter interface mechanism 308 should respond to positively to queries about the input value). Therefore, given sufficient updates such as the one shown in FIG. 3, it can be imagined that every element of Bloom filter 300 would be set to one, and hence any input value queried in the filter would appear to have been received by Bloom filter interface mechanism 308 (perhaps even when the input value had not been received).

Figure 4:
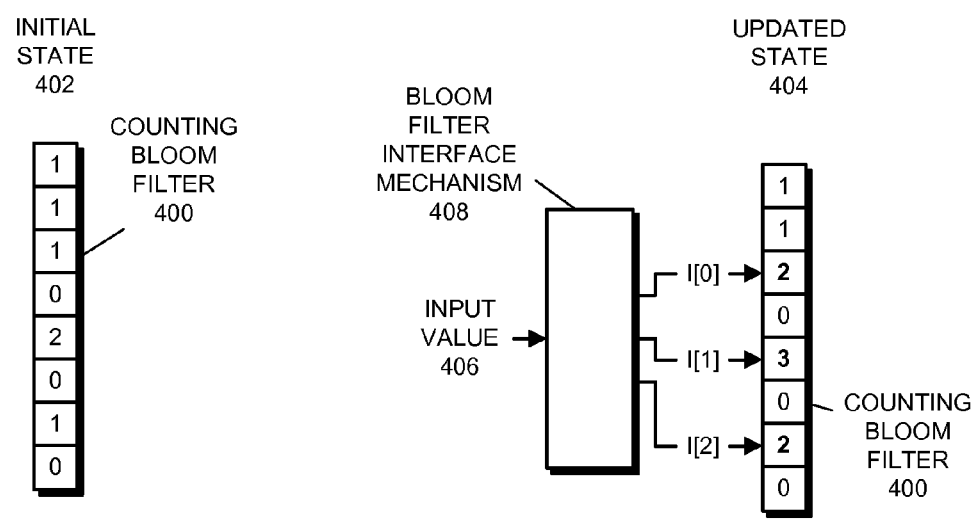
FIG. 4 presents a block diagram illustrating a counting Bloom filter in accordance with some embodiments.

FIG. 4 presents a block diagram illustrating a counting Bloom filter 400 in accordance with some embodiments. Counting Bloom filter 400 and Bloom filter interface mechanism 408 operate in a similar way to Bloom filter 300 and Bloom filter interface mechanism 308, with the exception of how updates occur in counting Bloom filter 400 and hence information that can be acquired during corresponding lookups in counting Bloom filter 400. Specifically, when an update occurs for given elements in counting Bloom filter 400, a count value in each element is incremented, and lookups in counting Bloom filter 400 can return a value for the count for each element (as well as a response indicating that the looked-up value has been encountered by Bloom filter interface mechanism 408).

For the example in FIG. 4, counting Bloom filter 400 is in an initial state 402 in the left side of the figure, and in an updated state 404 in the right side of the figure. In initial state 402, two (not-shown) input values have been received by Bloom filter interface mechanism 408 and used to update counting Bloom filter 400. Thus, various entries in counting Bloom filter 400 have been incremented accordingly. Note that the fifth entry in counting Bloom filter 400 has been incremented twice because the indices for both input values mapped to the fifth entry. In this state, counting Bloom filter 400 holds records of the two input values having been received by Bloom filter interface mechanism 408.

To arrive at updated state 404, an input value 406 is first received by Bloom filter interface mechanism 408. From input value 406, Bloom filter interface mechanism 408 generates a corresponding set of indices (shown as I[0]-I[2] in FIG. 3) and updates/increments counting Bloom filter 400 elements associated with the indices. As shown in FIG. 4, the increment causes the third, fifth, and seventh elements of counting Bloom filter 400 to be incremented (to 2, 3, and 2, respectively). After the update, the entries of counting Bloom filter 400 indicate that input value 406 and the two unseen earlier input values were received by Bloom filter interface mechanism 408.

Subsequent to the update, Bloom filter interface mechanism 408 may receive a lookup query inquiring if input value 406 has been received by Bloom filter interface mechanism 408. Bloom filter interface mechanism 408 can then process the query by generating a corresponding set of indices from input value 406 (which would again be I[0]-I[2]) and checking the corresponding entries in counting Bloom filter 400 to determine if the entries contain a non-zero value. Here, because the entries are set to various non-zero values, Bloom filter interface mechanism 408 can send a response to the query indicating that input value 406 may have been received by Bloom filter interface mechanism 408.

As described above, Bloom filter interface mechanism 408 can also retrieve the values in the corresponding elements and return the values in the response to the query. In this case, the values for input value 406 (2, 3, 2) can be interpreted to mean that input value 406 may have been received twice. Thus, as with Bloom filter 300, the entries in counting Bloom filter 400 are shared between input values. More specifically, in some embodiments, some or all of the entries in counting Bloom filter 400 that are incremented for a first input value may also be incremented for a second input value, a third input value, etc. (see, e.g., the example fifth entry in counting Bloom filter 400) Thus, the count in any of the entries in counting Bloom filter 400 for the first input value may be higher than the number of times the first input value was actually received by Bloom filter interface mechanism 408. This enables the maintenance of the above-described rule about false positives and false negatives—although in this case for the actual counts of input values that have been received by Bloom filter interface mechanism 408 (i.e., the count in any/all of the entries in counting Bloom filter 400 for a given input can be higher than the number of times that the given input has been received).

Mode-Setting Mechanism

Figure 5:
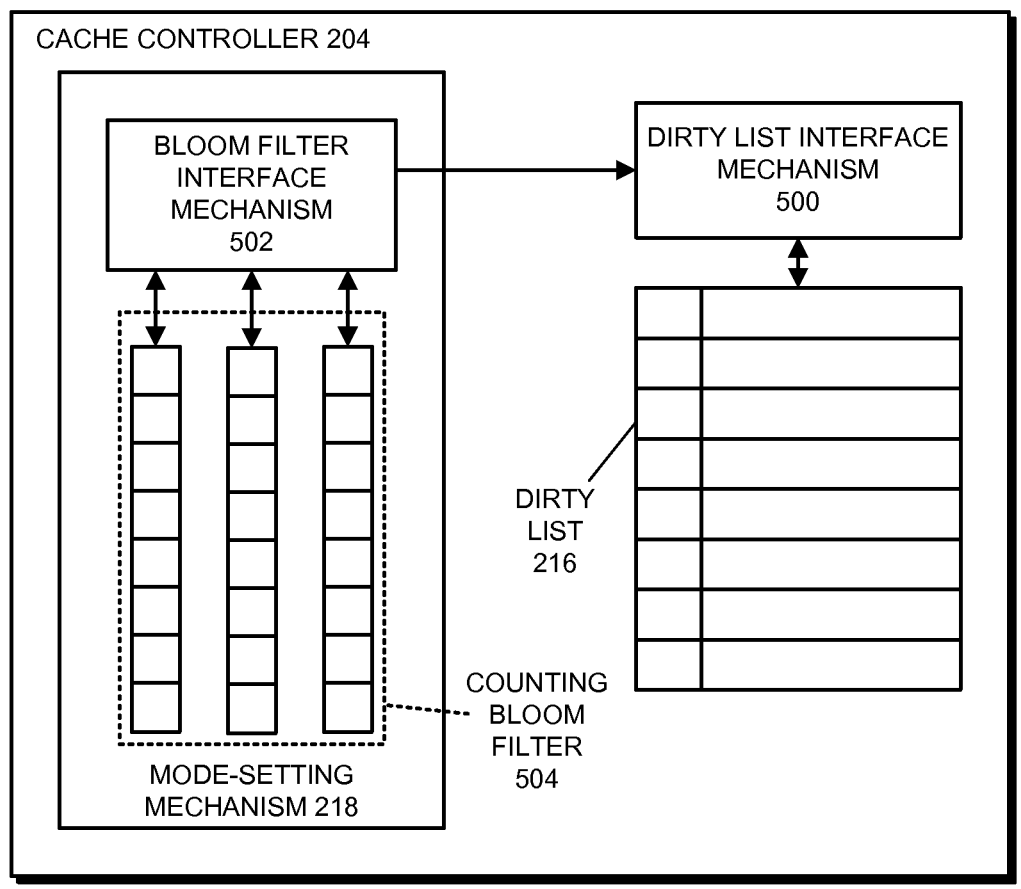
FIG. 5 presents a block diagram illustrating a cache controller with a mode-setting mechanism in accordance with some embodiments.

FIG. 5 presents a block diagram illustrating cache controller 204 with mode-setting mechanism 218 in accordance with some embodiments. As described above, mode-setting mechanism 218 is generally configured to perform operations for setting and adjusting the operating modes for regions in main memory 106.

As shown in FIG. 5, in some embodiments, cache controller 204 includes dirty list interface mechanism 500 (as well as dirty list 216), and mode-setting mechanism 218 includes counting Bloom filter 504 and Bloom filter interface mechanism 502. Generally, in these embodiments, mode-setting mechanism 218 uses counting Bloom filter 504 for keeping a count of the writes to one or more regions in main memory 106 at runtime. When counting Bloom filter 504 indicates that more than a threshold number of writes has occurred in at least one of the one or more regions in main memory 106, mode-setting mechanism 218 configures the at least one of the one or more regions in main memory 106 in the write-back mode. In these embodiments, to configure the at least one region in main memory 106 in the write-back mode, mode-setting mechanism 218 updates dirty list 216 to include an entry identifying the at least one region in main memory 106.

Dirty list interface mechanism 500 is a functional block that is configured to perform operations for maintaining dirty list 216. For example, dirty list interface mechanism 500 can update entries in dirty list 216, including determining entries to be replaced in accordance with a replacement policy, can perform lookups in dirty list 216 to determine if an entry in dirty list 216 contains information about a given region (and hence if the region of main memory 106 is operating in the write-back mode), can invalidate/delete entries in dirty list 216, and/or can perform other operations.

Bloom filter interface mechanism 502 is a functional block that is configured to perform operations for maintaining counting Bloom filter 504. For example, Bloom filter interface mechanism 502 can update entries in counting Bloom filter 504, can perform lookups in counting Bloom filter 504 to determine counts for entries, and/or can perform other operations.

In some embodiments, during operation (i.e., at runtime) as a write occurs in main memory 106, cache controller 204 forwards information about the write to Bloom filter interface mechanism 502 in mode-setting mechanism 218. For example, cache controller 204 can forward address information, source information for the write, operating mode information, and/or other information from the write and/or computing device 100 to Bloom filter interface mechanism 502. Bloom filter interface mechanism 502 then updates counting Bloom filter 504 based at least on a region in main memory 106 where the write occurred. For example, in some embodiments, Bloom filter interface mechanism 502 uses an address to which the write occurred (i.e., an address in main memory 106 to which data was written) to generate indices for entries in counting Bloom filter 504, the indices indicating entries in counting Bloom filter 504 that contain a count of writes the region in main memory 106. Bloom filter interface mechanism 502 then increments the counts in the corresponding entries (an example of generating indices and incrementing the counts in the corresponding entries is shown above in FIGS. 3-4). In incrementing the entries in counting Bloom filter 504 as described, Bloom filter interface mechanism 502 updates a count of the writes that have occurred in the region of main memory 106.

In some embodiments, Bloom filter interface mechanism 502 then uses the counts of the writes that have occurred in regions of main memory 106 in counting Bloom filter 504 to determine regions of main memory 106 to be placed in the write-back mode. For example, at a predetermined time (e.g., as each write occurs, every N ms, where N=50, 100, or anther value), Bloom filter interface mechanism 502 checks at least some of the entries in counting Bloom filter 504 to determine if the counts for one or more regions in main memory 106 are greater than a threshold value, and hence that more than a threshold number of writes have occurred in the one or more regions. For example, in some embodiments, assuming an example threshold value of 100 writes and given a region "A" in main memory 106 (e.g., a particular page or block of memory in main memory 106) that is to be checked, Bloom filter interface mechanism 502 computes indices for counting Bloom filter 504 from address information from region A (e.g., an address within the region, etc.) and uses the computed indices to retrieve the counts from each of the corresponding entries in counting Bloom filter 504. Bloom filter interface mechanism 502 then compares the retrieved counts to the threshold value and determines that more than a threshold number of writes have occurred in the region when each of the retrieved counts is greater than the threshold value. (Recall that the counts may differ because one or more of the entries in counting Bloom filter 504 may have been incremented for one or more different regions.) For any of the one or more regions for which more than a threshold number of writes have occurred, Bloom filter interface mechanism 502 determines that the region of main memory 106 should be configured in the write-back mode.

In some embodiments, the threshold value to which the values in the retrieved counts from counting Bloom filter 504 are compared is dynamically set and/or adjusted. For example, in some embodiments, the threshold value is set in accordance with an operating mode of main memory 106, computing device 100, etc. As another example, in some embodiments, the threshold value is set in accordance with a number of regions being placed (or that have been placed) in the write-back mode. In these embodiments, the threshold can be adjusted up or down to decrease or increase the number and/or rate of regions being placed in the write-back mode.

As described above, in some embodiments, in order to place a region in main memory 106 in the write-back mode, Bloom filter interface mechanism 502 updates an entry in dirty list 216 to include an identifier for the region. In doing this, in some embodiments, Bloom filter interface mechanism 502 communicates the identifier for the region to dirty list interface mechanism 500. For example, Bloom filter interface mechanism 502 can communicate a starting address for the region, a single address or range of addresses in the region, a variable representing the region, a number for the region, and/or another identifier to dirty list interface mechanism 500. Dirty list interface mechanism 500 then updates an entry in dirty list 216 with the identifier for the region (or with a value determined using the identifier for the region) and may add metadata associated with the identifier for the region to the entry.

In some embodiments, when dirty list 216 and/or a set in dirty list 216 is full (e.g., there are no entries in dirty list 216 or a set in dirty list 216 that do not already contain an identifier for a region in main memory 106), when updating the entry in dirty list 216 for a given region, dirty list interface mechanism 500 first deletes an existing entry to free up the entry for storing the identifier for the given region. In some embodiments, when deleting an existing entry, dirty list interface mechanism 500 follows a replacement policy (e.g., least-recently-used, etc.) to determine the entry that is to be deleted. In some embodiments, dirty list interface mechanism 500 uses metadata (e.g., a value representing last usage, flags, and/or other metadata) in entries in dirty list 216 when making replacement decisions under the replacement policy.

In some embodiments, after placing a region in main memory 106 in the write-back mode, Bloom filter interface mechanism 502 adjusts the counts in the corresponding entries in counting Bloom filter 504. Generally, adjusting the counts includes reducing the counts in a predetermined way to reset the counts so that a count of the writes in the region is reduced and the count is partially or entirely restarted for the region. For example, in some embodiments, the counts in the corresponding entries are reduced by half or another fraction. As another example, the counts in the corresponding entries can have a predetermined amount subtracted from them. In some embodiments, the amount of the reduction in the counts is dynamically adjusted. For example, the fraction by which the counts are reduced can be set in accordance with a number of regions that was placed in the write-back mode in the last B ms, where B=50, 100, etc.

In some embodiments, after updating an entry in dirty list 216 with the identifier for a region in main memory 106, cache controller 204 handles cache blocks from the region that are to be written in cache 200 in the write-back mode and hence writes modified cache blocks from the region to cache 200 without immediately forwarding the cache blocks to a next lower level of the memory hierarchy. For example, in some embodiments, upon receiving a cache block to be written to a given location in cache 200, cache controller 204 determines an identifier for the region where the cache block came from in main memory 106 (e.g., an address and/or other information for the cache block, a starting address for the region, a range of addresses in the region, a variable representing the region, a number for the region, and/or another identifier), and communicates the identifier to dirty list interface mechanism 500. Dirty list interface mechanism 500 then performs a lookup in dirty list 216 to determine if an entry with the identifier is present in dirty list 216. When such an entry is present in dirty list 216, dirty list interface mechanism 500 returns a confirmation to cache controller 204, and cache controller 204 handles the write of the cache block in cache 200 in the write-back mode. However, when such an entry is not present in dirty list 216, dirty list interface mechanism 500 does not send the confirmation (or responds negatively) and cache controller 204 handles the write of the cache block in cache 200 in the write-through mode.

As described above, when an entry is removed from dirty list 216, the corresponding region in main memory 106 is no longer configured in the write-back mode, and instead is (re-)configured in the write-through mode. When a region in main memory 106 is configured in the write-through mode, cache 200 should not include any modified cache blocks from the region in main memory 106 that have not been forwarded to the next lower level of the memory hierarchy. Thus, in some embodiments, upon removing the listing from dirty list 216 for the region, any modified cache blocks in cache 200 from the region in main memory 106 are immediately forwarded (e.g., evicted/flushed) to the next lower level of the memory hierarchy to be stored therein.

Although embodiments are described using counting Bloom filter 504 and dirty list 216, some embodiments use different functional blocks and records to determine regions in main memory 106 to be placed in the write-back mode. Generally, cache controller 204 can include any combination of functional blocks that can perform the operations herein described. In addition, although counting Bloom filter 504 includes three one-dimensional arrays, in some embodiments, counting Bloom filter 504 includes a different number and/or arrangement of arrays.

Processes for Configuring Regions of a Main Memory

Figure 6:
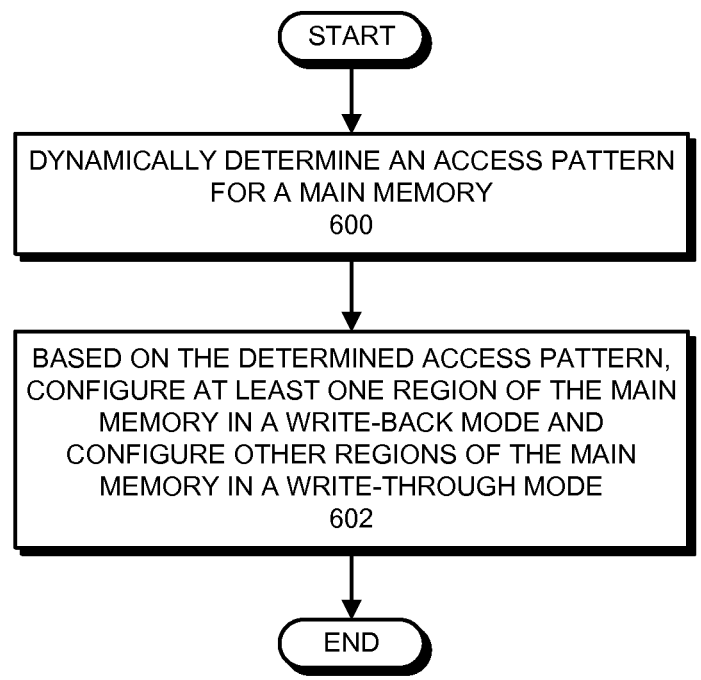
FIG. 6 presents a flowchart illustrating a process for configuring regions of main memory in a write-back mode in accordance with some embodiments.

FIG. 6 presents a flowchart illustrating a process for configuring at least one region of main memory 106 in a write-back mode in accordance with some embodiments. Note that the operations shown in FIG. 6 are presented as a general example of functions performed by some embodiments. The operations performed by other embodiments include different operations and/or operations that are performed in a different order. Additionally, although certain mechanisms in computing device 100 are used in describing the process, in some embodiments, other mechanisms can perform the operations.

In the following example, cache 200 is used to describe example operations performed by some embodiments. Recall that cache 200 is a general example of the caches in the memory hierarchy. Thus, any of the L1 caches 116-122, L2 cache 124, and L3 cache 104 can be implemented with similar internal mechanisms to cache 200, and can therefore perform some or all of the example operations in the same way. Additionally, in this description, the "next lower level of the memory hierarchy" from cache 200 refers to a cache or memory below cache 200 in the hierarchy, which is dependent on which cache is represented by cache 200. For example, in embodiments where cache 200 is L3 cache 104, the next lower level of the memory hierarchy is main memory 106. As another example, in embodiments where cache 200 is L2 cache 124, the next lower level of the memory hierarchy is L3 cache 104.

The process shown in FIG. 6 starts when mode-setting mechanism 218 in cache 200 dynamically determines an access pattern for main memory 106 (step 600). In some embodiments, to dynamically determine the access pattern, mode-setting mechanism 218 determines regions (e.g., pages, blocks of addresses, and/or portions) in main memory 106 that have experienced more than a threshold number of write operations. For example, in some embodiments, at runtime (i.e., while main memory 106 is operating), mode-setting mechanism 218 keeps a count of a number of write operations that occur in regions in main memory 106 and determines when the count for a region indicates that more than a threshold number of write operations have occurred in the region. In some embodiments, the threshold number is dynamically configured, i.e., set and/or reset at runtime.

In some embodiments, mode-setting mechanism 218 (or, more generally, cache controller 204) uses counting Bloom filter 504 to keep the count of regions in main memory 106 that have experienced more than a threshold number of write operations. In these embodiments, mode-setting mechanism 218 first determines an identifier for a region in main memory 106 to which the write operation is directed. Based on the identifier for the region, mode-setting mechanism 218 (e.g., Bloom filter interface mechanism 502 in mode-setting mechanism 218) computes indices for counting Bloom filter 504. Mode-setting mechanism 218 then increments counts in corresponding positions of the Bloom filter for each of the computed indices. In some of these embodiments, after incrementing the counts in the corresponding positions of the Bloom filter for a region, mode-setting mechanism 218 determines if the counts in each of the corresponding positions of the Bloom filter are greater than the threshold number. If so, mode-setting mechanism determines that the count indicates that more than the threshold number of write operations have occurred in the region (and thereby dynamically determines the access pattern for main memory 106).

Returning to FIG. 6, based on the determined access pattern, mode-setting mechanism 218 configures at least one region of main memory 106 in a write-back mode and configures other regions of main memory 106 in a write-through mode (step 602). For example, in some embodiments, upon determining that more than the threshold number of writes have occurred in the at least one region in main memory 106, mode-setting mechanism 218 (e.g., Bloom filter interface mechanism 502 in mode-setting mechanism 218) writes information about the at least one region to an entry in a dirty list 216. In these embodiments, regions with information in an entry in dirty list 216 are configured in the write-back mode, and regions without information in an entry in dirty list 216 are configured in the write-through mode.

In some embodiments, after configuring the region in the write-back mode when the count indicates that more than the threshold number of write operations have occurred in the region, mode-setting mechanism 218 reduces the count in corresponding positions of the Bloom filter by a predetermined amount. For example, as described above, the predetermined amount can be a fraction by which the count in each position is multiplied, an amount by which the count in each position is divided, an amount that is to be subtracted from the count in each position, etc. In some embodiments, the predetermined amount is dynamically configured, i.e., set and/or reset at runtime.

In some embodiments, cache controller checks dirty list 216 before performing a write operation in cache 200 to determine whether the corresponding cache block is from a region main memory 106 that is configured in the write-back mode or the write-through mode. (A cache block is "from a region in main memory 106" when a copy of the cache block is stored in the region in main memory 106.) For example, given a memory request that performs a write for a cache block from a given address, cache controller 204 can cause dirty list interface mechanism 500 to perform a lookup in dirty list 216 to determine if an entry in dirty list 216 matches the address (i.e., if the address is located within a region in main memory 106 that is listed in dirty list 216). In these embodiments, cache controller 204 then performs a corresponding write operation (i.e., a write-back write operation or a write-through write operation) to write the cache block in the cache.

As described above, in some embodiments, at a predetermined time after configuring the regions of main memory 106 in the write-back mode or the write-through mode, mode-setting mechanism 218 is configured to re-configure at least one region of main memory 106 from a write-back mode to a write-through mode or from a write-through mode to a write-back mode based on the count of the number of write operations that occur in each region. In this way, mode-setting mechanism 218 can dynamically (i.e., at runtime and based on runtime conditions) configure and re-configure the operating mode of the regions of main memory 106.

Excluded Regions

In some embodiments, cache controller 204 (or another mechanism in computing device 100) is configured to statically configure one or more regions in an excluded set of regions in main memory 106 in the write-through mode or write-back mode. In these embodiments, the regions in the excluded set of regions are not configured based on the determined access pattern. More specifically, assuming that main memory 106 is divided into a number M of regions, a number P<M of the regions can be configured by cache 200, an operating system on computing device 100, a processor core, etc. as write-back and/or write-through on a per-region basis. In some of these embodiments, at least some of the statically configured P regions may not be dynamically updated or adjusted by mode-setting mechanism 218 and/or cache controller 204 at runtime (i.e., the configuration is kept for the statically-configured regions at runtime).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a cache memory, comprising:
   by a mode-setting mechanism, performing operations for:
      keeping a count of a number of write operations that occur in each region in a set of regions in a main memory;
      configuring at least one region of the main memory in a write-back mode when the count for the at least one region exceeds a threshold; and
      configuring other regions of the main memory in a write-through mode when the count for the other regions is greater than zero but less than or equal to the threshold.

2. The method of claim 1, wherein keeping the count of the number of write operations that occur in each region in the set of regions in the main memory comprises:
   for each write operation that occurs in the main memory,
      computing indices for a Bloom filter based on a region in the main memory to which the write operation applies; and
      incrementing counts in corresponding positions of the Bloom filter for each of the computed indices.

3. The method of claim 2, wherein the method further comprises:
   after incrementing the counts in the corresponding positions of the Bloom filter for the given region, determining that the count indicates that more than the threshold number of write operations have occurred in the given region when the counts in each of the corresponding positions of the Bloom filter are greater than the threshold number.

4. The method of claim 3, wherein the method further comprises, after configuring the given region in the write-back mode when the count indicates that more than the threshold number of write operations have occurred in the given region:
   performing a predetermined operation to reduce the count in corresponding positions of the Bloom filter.

5. The method of claim 1, wherein the method further comprises:
   at a predetermined time after configuring the regions of the main memory in the write-back mode or the write-through mode, re-configuring at least one region of the main memory from a write-back mode to a write-through mode or from a write-through mode to a write-back mode based on the count of the number of write operations that occur in each region.

6. The method of claim 1, wherein configuring the at least one region of the main memory in the write-back mode comprises:

writing information about the at least one region to an entry in a dirty list, wherein regions with information in an entry in the dirty list are configured in the write-back mode, and other regions are configured in the write-through mode.

7. The method of claim 6, wherein the method comprises:
before writing the information about the region to the entry in the dirty list, deleting existing information about another region from the entry.

8. The method of claim 6, wherein the dirty list is set associative and wherein the method further comprises:
determining a set and an entry in the set in which the information about the region is to be written based on a predetermined policy.

9. The method of claim 6, wherein the method further comprises:
checking the dirty list before writing a cache block to the cache memory to determine if the cache block is from a region in the main memory that is configured in the write-back mode; and
write the cache block to the cache memory using a corresponding write operation.

10. The method of claim 1, wherein configuring at least one region of the main memory in the write-back mode comprises configuring at most a predetermined number of regions in the main memory in the write-back mode.

11. The method of claim 1, wherein the method further comprises:
statically configuring one or more regions in an excluded set of regions in the main memory in the write-through mode or write-back mode, wherein the regions in the excluded set of regions are not configured based on a corresponding count of a number of write operations.

12. An apparatus for operating a cache memory, comprising:
a cache controller in the cache memory;
a mode-setting mechanism in the cache controller, wherein the mode-setting mechanism is configured to:
keep a count of a number of write operations that occur in each region in a set of regions in a main memory;
configure at least one region of the main memory in a write-back mode when the count for the at least one region exceeds a threshold; and
configure other regions of the main memory in a write-through mode when the count for the other regions is greater than zero but less than or equal to the threshold.

13. The apparatus of claim 12, wherein, when keeping the count of the number of write operations that occur in each region in the set of regions in the main memory, the mode-setting mechanism is configured to:
for each write operation that occurs in the main memory,
compute indices for a Bloom filter based on a region in the main memory to which the write operation applies; and
increment counts in corresponding positions of the Bloom filter for each of the computed indices.

14. The apparatus of claim 13, wherein, after incrementing the counts in the corresponding positions of the Bloom filter for the given region, the mode-setting mechanism is configured to determine that the count indicates that more than the threshold number of write operations have occurred in the given region when the counts in each of the corresponding positions of the Bloom filter are greater than the threshold number.

15. The apparatus of claim 14, wherein, after configuring the given region in the write-back mode when the count indicates that more than the threshold number of write operations have occurred in the given region:
perform a predetermined operation to reduce the count in corresponding positions of the Bloom filter.

16. The apparatus of claim 12, wherein, when configuring the at least one region of the main memory in the write-back mode, the mode-setting mechanism is configured to:
write information about the at least one region to an entry in a dirty list, wherein regions with information in an entry in the dirty list are configured in the write-back mode, and other regions are configured in the write-through mode.

17. The apparatus of claim 16, wherein the mode-setting mechanism is configured to:
check the dirty list before writing a cache block to the cache memory to determine if the cache block is from a region in the main memory is configured in the write-back mode; and
write the cache block to the cache memory using a corresponding write operation.

18. A non-transitory computer-readable storage device storing instructions that, when executed by a computing device, cause the computing device to perform a method for operating a cache memory, the method comprising:
keeping a count of a number of write operations that occur in each region in a set of regions in a main memory;
configuring at least one region of the main memory in a write-back mode when the count for the at least one region exceeds a threshold; and
configuring other regions of the main memory in a write-through mode when the count for the other regions is greater than zero but less than or equal to the threshold.

* * * * *